United States Patent [19]

Okuyama

[11] Patent Number: 4,959,007
[45] Date of Patent: Sep. 25, 1990

[54] INSERT-TYPE ROTARY CORE MOLD APPARATUS

[75] Inventor: Kazuhiko Okuyama, Chiba, Japan

[73] Assignee: Sumitomo Heavy Industries Ltd., Tokyo, Japan

[21] Appl. No.: 346,843

[22] Filed: May 3, 1989

[51] Int. Cl.⁵ .............................................. B29C 45/38
[52] U.S. Cl. ...................................... 425/577; 249/59; 425/418; 425/422; 425/438
[58] Field of Search ............... 425/182, 183, 185, 190, 425/191, 574, 575, 577, 418, 422, 438; 249/59

[56] References Cited

U.S. PATENT DOCUMENTS

| | | | |
|---|---|---|---|
| 2,339,443 | 1/1944 | Wilson | 425/577 |
| 2,457,336 | 12/1948 | Wilson | 425/577 |
| 2,799,049 | 7/1957 | Wilson | 425/438 |
| 3,718,419 | 2/1973 | Adamo | 249/59 |
| 4,090,631 | 5/1978 | Grussen | 215/329 |
| 4,139,176 | 2/1979 | Wundsch | 249/59 |

FOREIGN PATENT DOCUMENTS

| | | |
|---|---|---|
| 0287203 | 2/1988 | European Pat. Off. |
| 1-148524 | 6/1989 | Japan |
| 1397111 | 5/1972 | United Kingdom |

Primary Examiner—Jay H. Woo
Assistant Examiner—Timothy W. Heitbrink
Attorney, Agent, or Firm—Armstrong, Nikaido, Marmelstein, Kubovcik & Murray

[57] ABSTRACT

One of two mold halves to be clamped is composed of an insert holder, an insert mounted detachably on the insert holder, and a rotary core supported rotatably by the insert and having a threaded portion formed on an outer peripheral surface thereof. When clamping is effected, the rotary core is caused to project into a cavity formed in the other mold half, and moldings are injection molded inside the cavity around the rotary core. The insert holder is provided with a driving source such as a motor-driven gear, while the insert is provided with a rotation transmitting mechanism composed of such as gears for rotating the rotary core. If the insert is mounted in the insert holder, the driving source provided in the insert holder is coupled with the rotation driving mechanism provided in the insert, rotating the rotary core and making it possible to remove the moldings having a thread formed on an inner surface thereof from the rotary core by rotating the rotary core. When the type of molding is to be changed, it suffices if the rotary core and the insert are replaced, allowing the mold replacing time to be reduced appreciably and the cost of producing the mold can be lowered substantially.

4 Claims, 3 Drawing Sheets

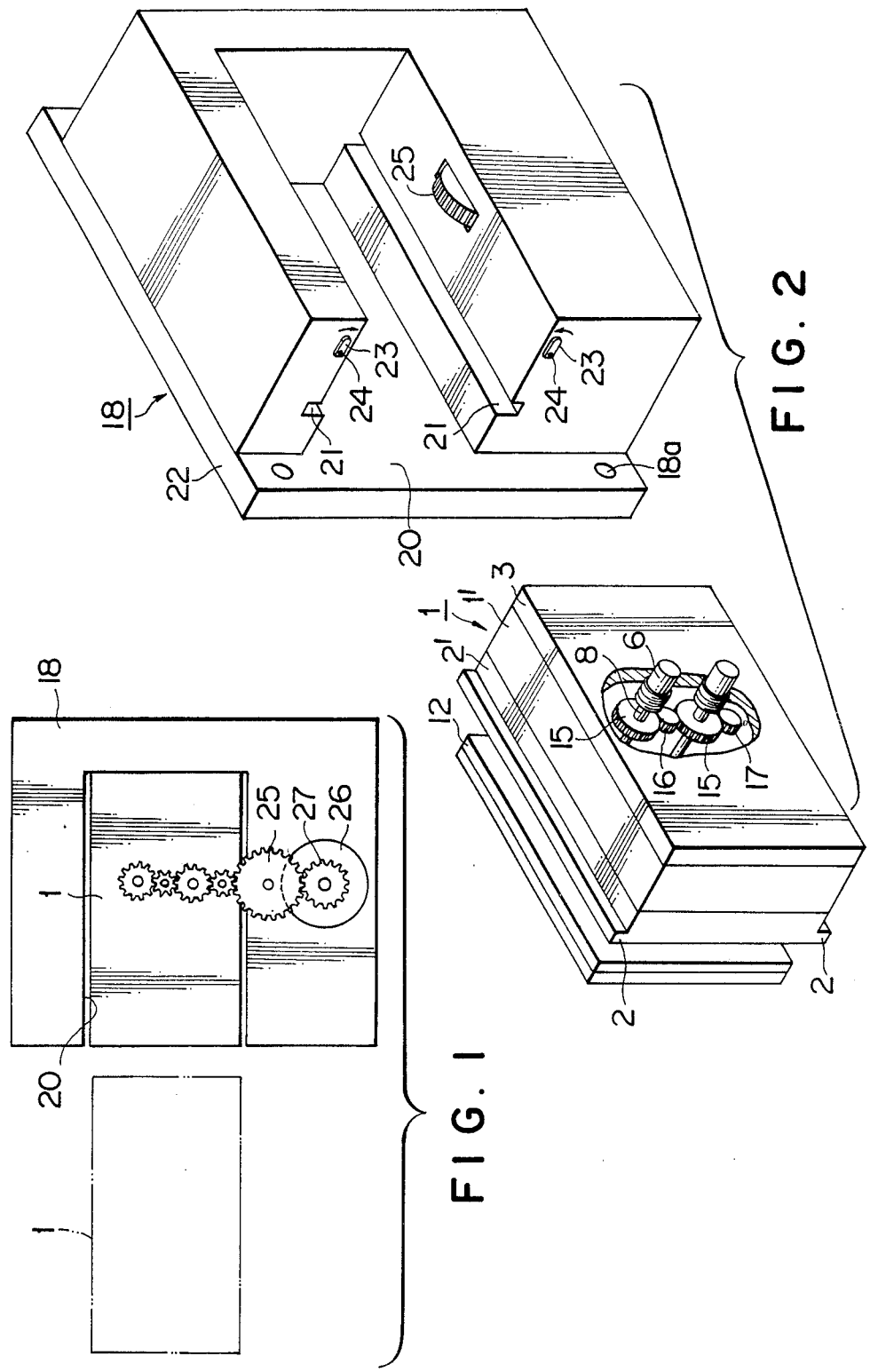

INSERT-TYPE ROTARY CORE MOLD APPARATUS

BACKGROUND OF THE INVENTION

1. Field of the Invention

The present invention relates to an insert-type rotary core mold apparatus for injection-molding articles having threads formed on inner surfaces thereof.

2. Description of the Prior Art

Conventional rotary core molds are of an integrated type in which a mold base and a cavity core section are combined during production, and there have been no insert-type rotary core molds. For this reason, it has been necessary to fabricate the overall rotary core mold according to each type of molding, and the cost of making molds has been high. In addition, it is necessary to replace the mold each time the type of molding is changed. However, since the weight of the mold is large, and that operation is not easy, there has been a drawback in that the replacement of the mold is time-consuming.

SUMMARY OF THE INVENTION

Accordingly, an object of the present invention is to provide an insert-type rotary core mold apparatus which is capable of enhancing productivity by reducing the time required for mold replacement and the costs of the mold.

To this end, according to the present invention, there is provided an insert-type rotary-core mold apparatus comprising: an insert holder mounted on one of a moving platen and a stationary platen of a molding machine; a mold having a cavity facing the direction of the insert holder and secured to the other platen; an insert mounted detachably on the insert holder; a rotary core supported rotatably by the core and adapted to project inside a cavity of the mold when the mold is clamped; a driving source provided on the insert holder; and a rotation transmitting mechanism which is provided on the insert and is operatively connected to the driving source when the insert is mounted in the holder, so as to rotate the rotary core.

BRIEF DESCRIPTION OF THE DRAWINGS

FIG. 1 is a diagram schematically illustrating a rotation transmitting mechanism in accordance with an embodiment of the present invention;

FIG. 2 is a perspective view illustrating a state in which an insert has been removed from an insert holder in accordance with the embodiment of the present invention;

DESCRIPTION OF THE PREFERRED EMBODIMENTS

Figure 3:
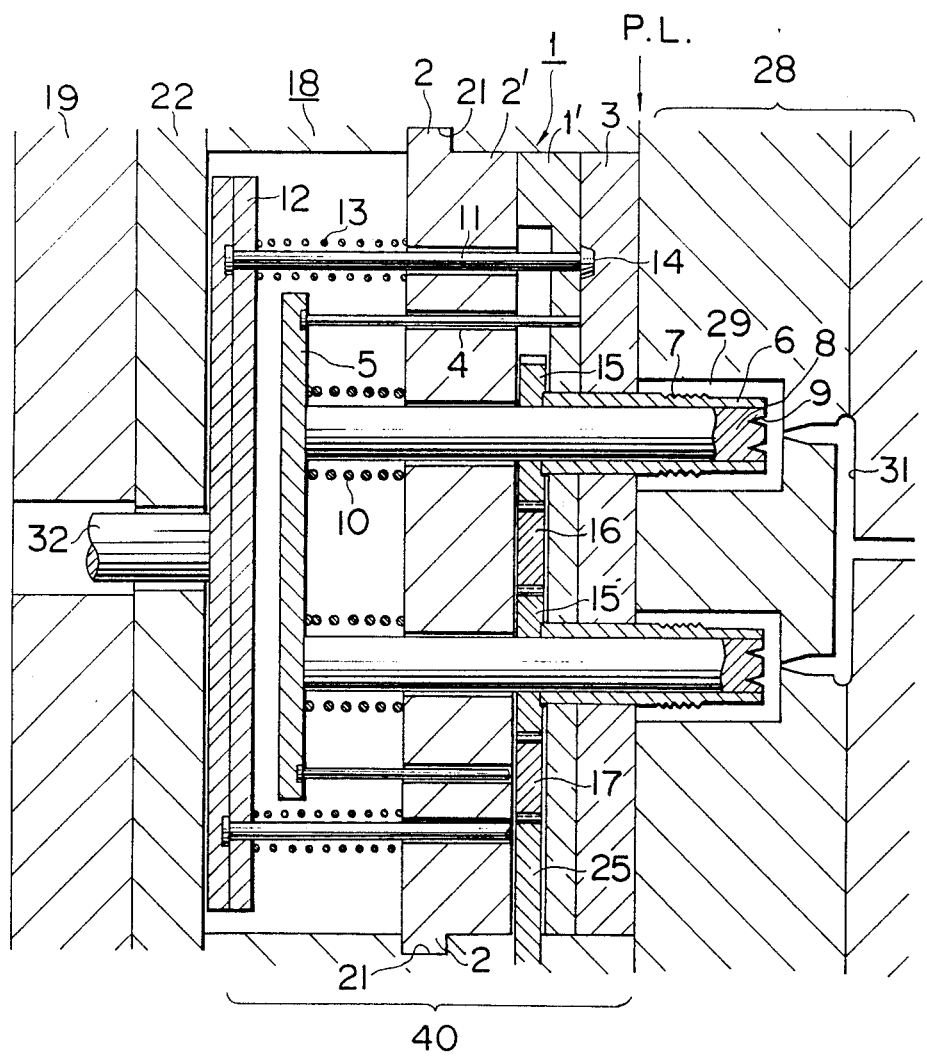
FIG. 3 is a vertical cross-sectional view illustrating a mold structure in a clamped state in accordance with the embodiment of the present invention.

Referring now to the accompanying drawings, a description will be given of the preferred embodiments of the present invention.

As shown in FIG. 2, an insert body 1 comprises a front portion 1' and a rear portion 2', and engaging collars 2 are formed on the side surfaces (upper and lower side surfaces as viewed in FIG. 2) of the insert body 1. A stripper plate 3 is disposed on the front surface of this insert body 1 in such a manner as to be capable of advancing and retracting freely, while distal ends of guide pins 4 face a rear-end surface of the stripper plate 3. In addition, a core connecting plate 5 to which the proximal ends of the guide pins 4, whose distal ends face the stripper plate 3 are connected, is disposed on the side of the insert body 1 which is remote from the side where the stripper plate 3 is provided.

One or a plurality of rotary cores (a plurality is shown in the embodiment) 6 formed into a cylindrical shape penetrate the stripper plate 3 and are fitted with the insert body 1 in such a manner as to be only capable of effecting rotation, a threaded portion 7 being formed around the outer peripheral surface of the rotary core 6.

A fixed core 8 is fitted slidably inside the rotary core 6, a proximal end thereof being connected to the core connecting plate 5. In addition, the distal end of the fixed core 8 forms a part of a cavity 29, and is provided with a recess 9 (detent) for preventing rotation.

A tensile spring 10 is adapted to urge an extruding force from the insert body 1, and is wound around the fixed core 8, one end thereof being secured to the core connecting plate 5 and the other end thereof being secured to the insert body 1.

An ejector pin 11 has its proximal end connected to an ejector plate 12 and its distal end facing the stripper plate 3. The ejector pin 11 is slidably fitted with the insert body 1 and is adapted to urge a returning force toward the ejector plate 12 side by means of a compression spring 13 disposed by being wound around the ejector pin 11 between the ejector plate 12 and the insert body 1. A retaining portion 14 is formed at the distal end of this ejector pin 11 in such a manner that the ejector pin 11 does not come off from the insert body 1 by means of the returning force urged by the compression spring 13. A gear 15 is mounted on a proximal end of the rotary core 6 located inside the insert body 1. An intermediate gear 16 engaging with both of these gears 15 and an intermediate gear 17 engaging with one of the gears 15 are provided inside the insert body 1.

An insert holder 18 is mounted on a moving platen 19. An insert mounting section 20 in which a side thereof (it is provided laterally in the embodiment, but is not restricted to the same) is used as an inlet and outlet port for the insert body 1 is formed in the insert holder 18. Engaging grooves 21 which engage with the engaging collars 2 provided on the insert body 1 are formed on the upper and lower surfaces of the insert holder 18 in the insert mounting section 20. A base-plate 22 is formed integrally with the insert holder 18, bolt holes 18a being formed at four corners thereof so as to allow the insert holder 18 to be mounted on the movable platen 19 as the bolts are tightened. Insert locks 23 are provided at the insert inlet and outlet section of the insert holder 1 by means of bolts 24. The arrangement is such that the insert members 1 to 17 are mounted in the insert holder 18 by being inserted into the insert mounting section 20 and the insert locks 23 are then rotated 90 degrees and are secured by means of the bolts 24. A gear 25 is provided in the insert holder 18 with a portion thereof projecting in the insert mounting section 20 and meshes with a gear 27 provided at a driving source such as a motor 26 provided in the insert holder 18 and with the gear 17 of the insert members 1 to 17 mounted in the insert mounting section 20.

A stationary-side mold half 28 is opposed to a moving-side mold half 40 and is mounted on a stationary platen (not shown).

The cavity 29 is defined by a cavity surface provided on the stationary-side mold half 28, the stripper plate 3, the rotary core 6, and the fixed core 8 in a state in which the stationary-side mold half 28 and the moving-side mold half 40 are clamped.

Figure 4:
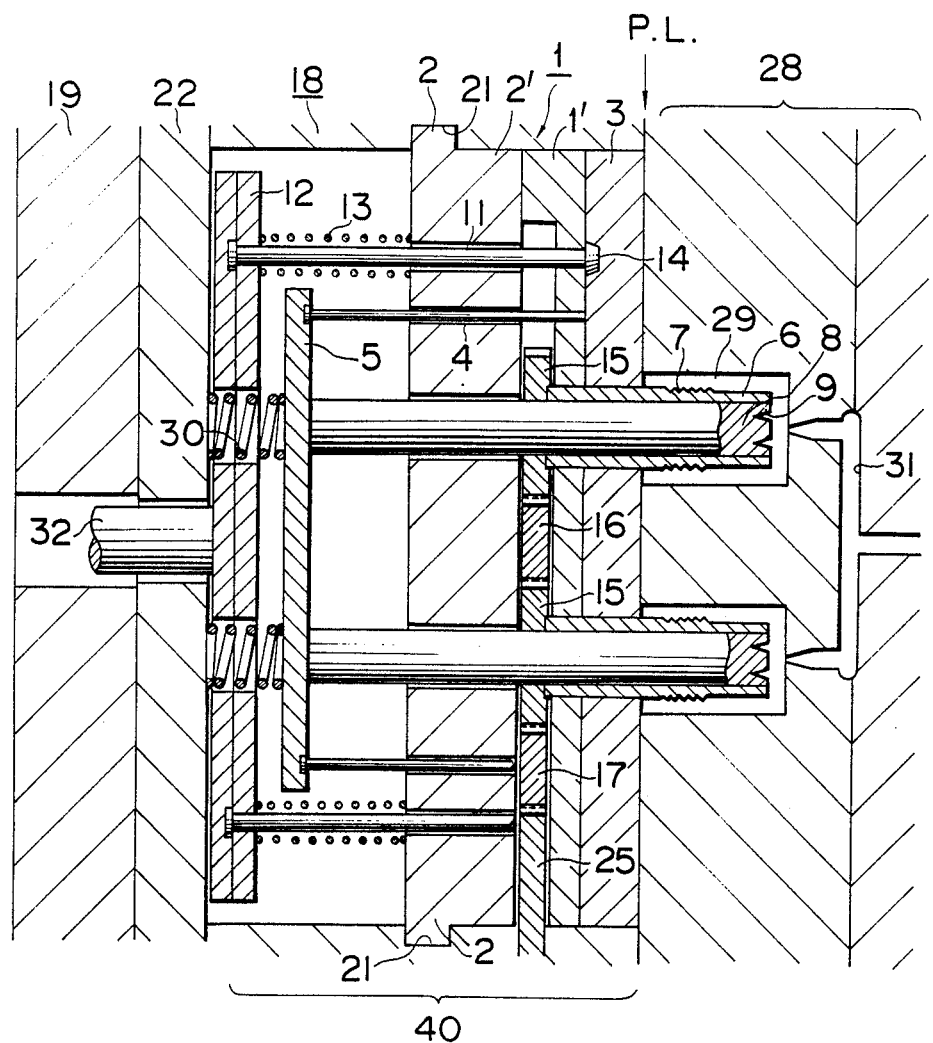
FIG. 4 is a vertical cross-sectional view illustrating a mold structure in a clamped state in accordance with another embodiment of the present invention.

In this embodiment, a description has been given of an example in which the tensile spring 20 is stretched between the core connecting plate 5 and the inset body 1 so as to urge the extruding force from the insert body 1 side against the fixed cores 8. However, an arrangement may be provided alternatively in which, as shown in FIG. 4, a compression spring 30 is provided which penetrates the ejector plate 12 and has one end thereof abutting the core connecting plate 5 and the other end thereof abutting the baseplate 22 of the insert holder 18. In addition, although a description has been given of an example in which a gear mechanism is employed as a mechanism for transmitting the rotational force with respect to the rotary cores 6, it goes without saying that other types of transmitting mechanism such as a belt, chain, etc., may be employed.

If the moving platen 19 is advanced toward the stationary-platen by a claim (not shown), and the stationary-side mold half 28 and the moving-side mold half 40 are clamped, the stripper plate 3 retracts toward the insert body 1 side and is brought into contact with the insert body 1. At the same time, the guide pins 4 whose distal ends are opposed to the stripper plate 3 retract. Then, the fixed cores 8 also retract via the core connecting plate 5 to which the proximal ends of the guide pins 4 are connected, and the tensile springs 10 provided between the core connecting plate 5 and the insert body 1 are stretched (the compression springs 30 are compressed). The extruding force of the fixed cores 8 is retained by means of the resiliency of the springs. Thus, the cavity 29 is formed by the rotary core 6, the fixed core 8, the stripper plate 3, and the cavity surface of the stationary-side mold half 28. If a molten resin is injected into this cavity 29 from an injection nozzle of a plasticator (not shown) via a passage 31 so as to effect molding, moldings are formed in which threads are formed on inner surfaces thereof by means of the threaded portion 7 provided around the rotary core 6.

Even if a gap is created between the stationary-side mold half 28 and the stripper plate 3 when the molds are opened after injection molding, the moldings are threadingly engaged with the rotary cores 6 provided on the insert body 1 in such a manner as to be only capable of performing rotation, and they thus remain attached. Therefore, the stripper plate 3 is held between the insert body 1 and the moldings and are not separated from the insert body 1, so that gate cutting is effected positively. However, the stripper plate 3 and the fixed core 8 receive a tightening force in the clamping direction applied by the tensile spring 10 (or compression spring 30). Consequently, after the molds are opened, if the rotary core 6 is rotated in the direction in which the moldings come off (the direction contrary to that of the thread) by the motor 26 via the gears 15, 16, 17 and 25, the detent formed as the recess 9 provided at the tip of the fixed core 8 is engaged with the moldings, with the result that the moldings do not rotate. Hence, the moldings are withdrawn from the rotary core 6 while being slightly pushed by the fixed core 8 and the stripper plate 3. At this time, even if the threaded portion of the moldings is removed from the threaded portion 7 of the rotary core 6, the fixed core 8 and the stripper plate 3 move in cooperation. Hence, the moldings remain engaged with the recess 9 provided in the fixed core 8 for preventing the rotation so that they do not drop.

Subsequently, if the ejector pin 11 is thrust by a ejector cylinder 32 (the rod alone is shown) via the ejector plate 12 so as to advance the stripper plate 3 further, the engagement of the moldings with the recess 9 for preventing rotation is released by the stripper plate 3, with the result that the molds fall down due to their own weight or are removed by a removing machine or the like.

Thereafter, the molding operation is continued in the same procedure as the one described above.

When the type of molding to be changed, the insert members 1 to 17 are replaced. Specifically, it suffices if the insert locks 23 are unlocked by loosening the bolts 24, the insert members 1 to 17 are withdrawn from the insert mounting section 20, and other inset members 1 to 17 to be used are mounted in the insert holder 18 in the reverse procedure of the one described above. During this replacement, the gears 17 on the insert body 1 side and the gear 25 on the insert holder 18 side are automatically connected to or disconnected from each other. Incidentally, when the threads of the gears 17, 25 are brought into contact with each other and do not mesh properly, if the insert is pushed in or withdrawn a number of times at short strokes, the gears 17, 25 can always be meshed with each other.

As described above, in accordance with the present invention, since the rotary-core mold is made into an insert type, the time required for replacing the mold can be reduced appreciably, thereby making it possible to improve productivity. When the type of molding is to be changed, it only suffices to fabricate the insert alone, thereby substantially reducing the cost of the mold. In addition, since the motor for rotating the rotary core and the rotational force transmitting mechanism are provided on the insert holder side for common use for various inserts, it is possible to reduce the weight of the insert and further decrease the costs of the mold.

What is claimed is:

1. A rotary-core mold apparatus comprising:
   an insert holder mounted on a first platen of a molding machine;
   a mold having a cavity facing the insert holder, said mold being secured to a second platen of said molding machine, one of said first and second platens being stationary and a remaining platen being movable;
   an insert mounted detachably on said insert holder;
   a rotary core supported rotatably by said insert, said rotary core being adapted to project inside said cavity of said mold when said mold is clamped to said insert holder which has said insert mounted thereon;
   a driving source provided on said insert holder; and
   a rotation transmitting mechanism which is provided on said insert and is operatively connected to said driving source when said insert is mounted in said holder, so as to rotate said rotary core.

2. The mold apparatus according to claim 1, wherein said rotary core is formed with a hollow portion and is provided with a threaded portion on an outer peripheral surface thereof, and said mold apparatus further comprises a fixed core supported axially slidably by said insert and fittingly inserted in the hollow portion of said rotary core, means for pressing said fixed core into aid cavity of said mold, means for retaining a distal end of said fixed core at a predetermined position inside said cavity of said mold when said mold is clamped, and a detent formed on a distal end surface of said fixed core for preventing rotation of a molding in said cavity.

3. The mold apparatus according to claim 1, wherein said driving source is a gear driven by a motor, while said rotation transmitting mechanism is a gear transmission mechanism including a pinion engaging with said gear when said insert is mounted on said insert holder.

4. The mold apparatus according to claim 2, wherein said driving source is a gear driven by a motor, while said rotation transmitting mechanism is a gear transmission mechanism including a pinion engaging with said gear when said insert is mounted on said insert holder.

* * * * *